United States Patent
Choi et al.

(10) Patent No.: US 12,109,768 B2
(45) Date of Patent: Oct. 8, 2024

(54) THERMOPLASTIC COMPOSITE GRIP FOR MANUFACTURING PROCESS

(71) Applicant: KOLON DACC COMPOSITE Co., Ltd., Haman-gun (KR)

(72) Inventors: Oyoung Choi, Haman-gun (KR); Kyungseok Jung, Changwon-si (KR); Moonsung Ko, Changwon-si (KR)

(73) Assignee: KOLON DACC COMPOSITE CO., LTD., Haman-gun (KR)

( * ) Notice: Subject to any disclaimer, the term of this patent is extended or adjusted under 35 U.S.C. 154(b) by 226 days.

(21) Appl. No.: 17/784,764

(22) PCT Filed: Nov. 6, 2020

(86) PCT No.: PCT/KR2020/015533
§ 371 (c)(1),
(2) Date: Jun. 13, 2022

(87) PCT Pub. No.: WO2021/118069
PCT Pub. Date: Jun. 17, 2021

(65) Prior Publication Data
US 2023/0010052 A1    Jan. 12, 2023

(30) Foreign Application Priority Data
Dec. 13, 2019  (KR) .................. 10-2019-0166977

(51) Int. Cl.
*B29C 70/54*   (2006.01)
*B29K 101/12*  (2006.01)

(52) U.S. Cl.
CPC ........ *B29C 70/543* (2013.01); *B29K 2101/12* (2013.01)

(58) Field of Classification Search
None
See application file for complete search history.

(56) References Cited

FOREIGN PATENT DOCUMENTS

| DE | 102012024060 A1 * | 6/2014 | ............. B29B 11/16 |
| KR | 10-2014-0145668 | 12/2014 | |
| KR | 10-2018-0071860 | 6/2018 | |
| KR | 10-1883141 | 7/2018 | |
| WO | WO-2019082055 A1 * | 5/2019 | ............. B29B 11/16 |

OTHER PUBLICATIONS

English Translation of DE102012024060 (Year: 2014).*

* cited by examiner

*Primary Examiner* — Robert J Grun
(74) *Attorney, Agent, or Firm* — LEX IP MEISTER, PLLC

(57) ABSTRACT

Disclosed herein is an apparatus for fixing a thermoplastic composite. The apparatus for fixing a thermoplastic composite for fixing the thermoplastic composite and placing a transferring tray to be transferred to a forming mold, the apparatus comprising a frame unit having a location space where the thermoplastic composite is positioned and placed on the transferring tray, and a plurality of connecting units for connecting the frame unit and the thermoplastic composite to pull the thermoplastic composite toward the frame unit. In this case, the plurality of connecting units have variable length and move along the frame unit.

10 Claims, 8 Drawing Sheets

[Figure 1]
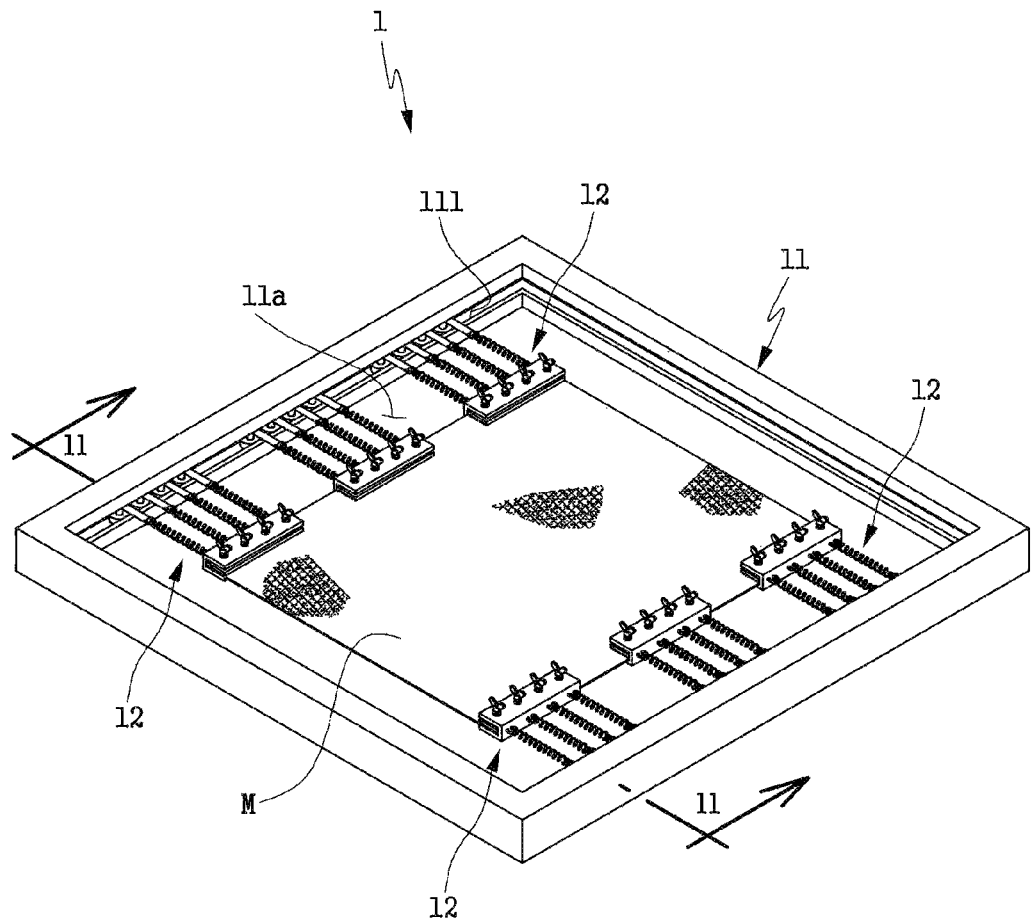
[Figure 2]
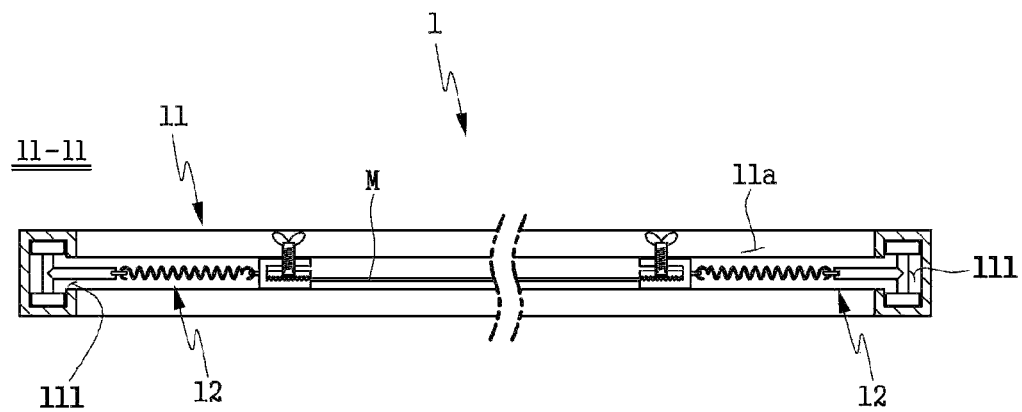

【Figure 3】
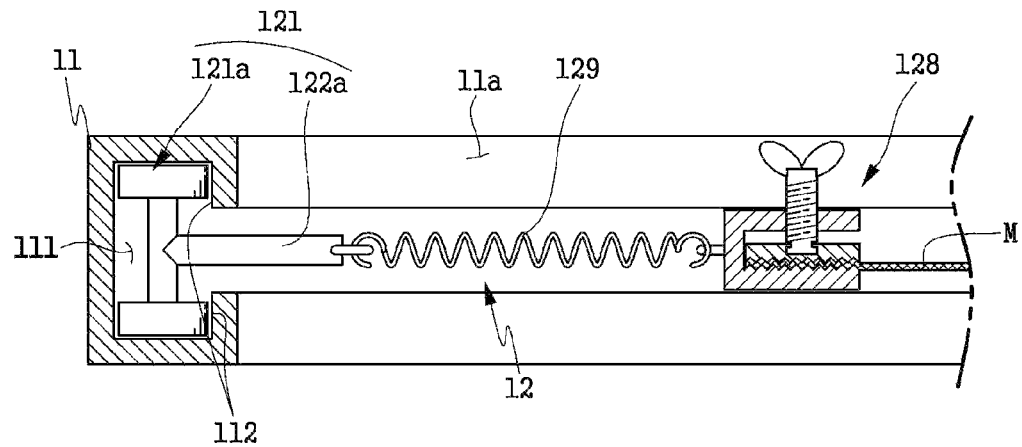
【Figure 4】
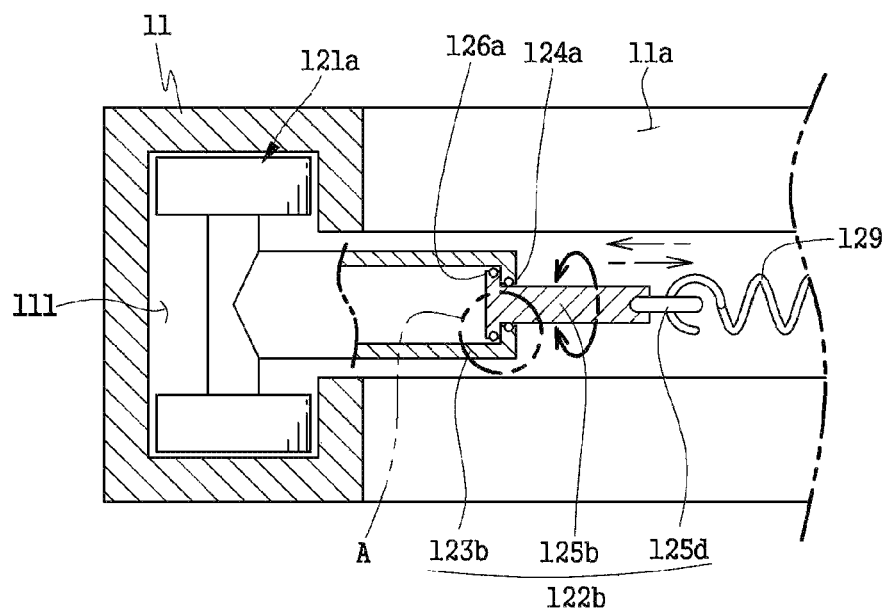

[Figure 5]
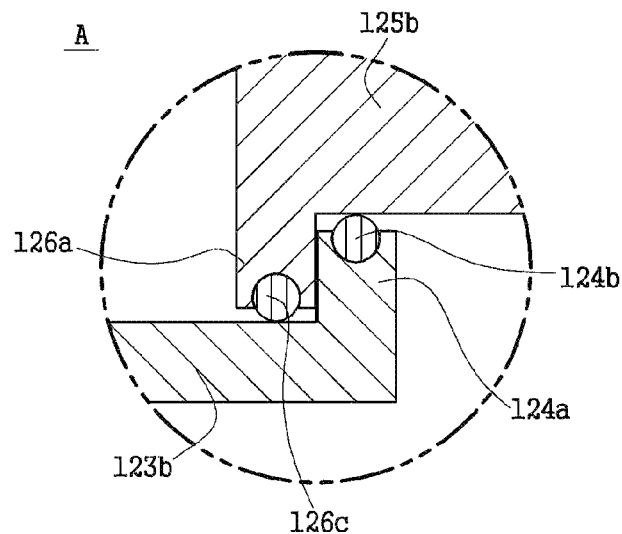
[Figure 6]
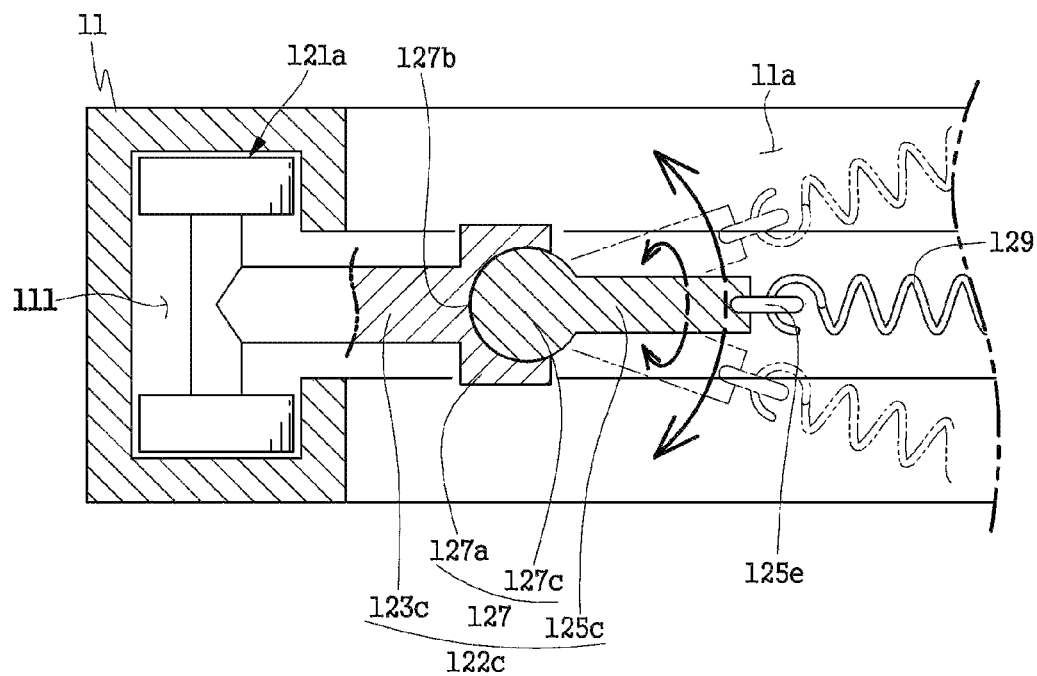

[Figure 7]
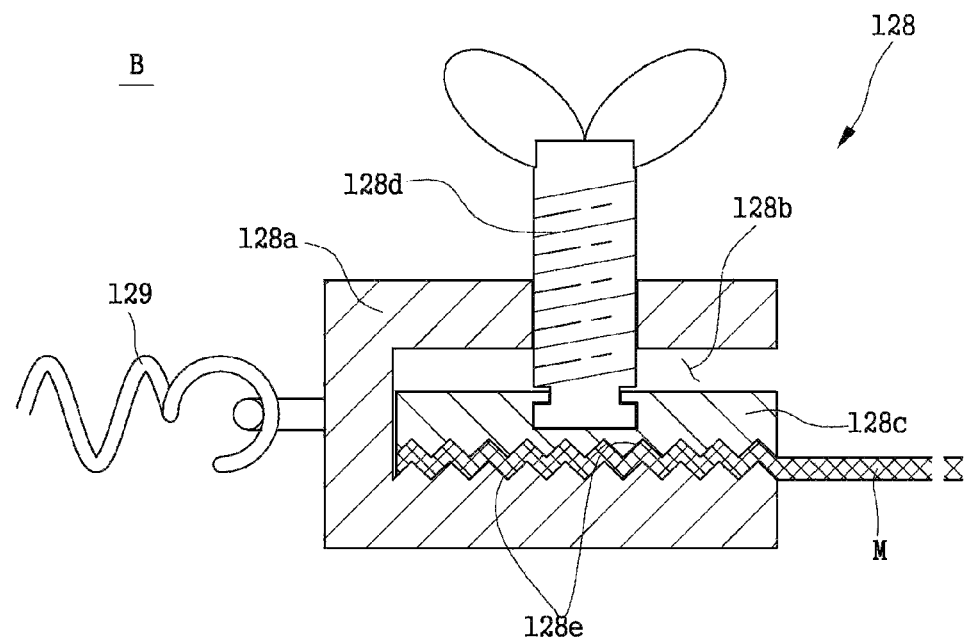

[Figure 8]
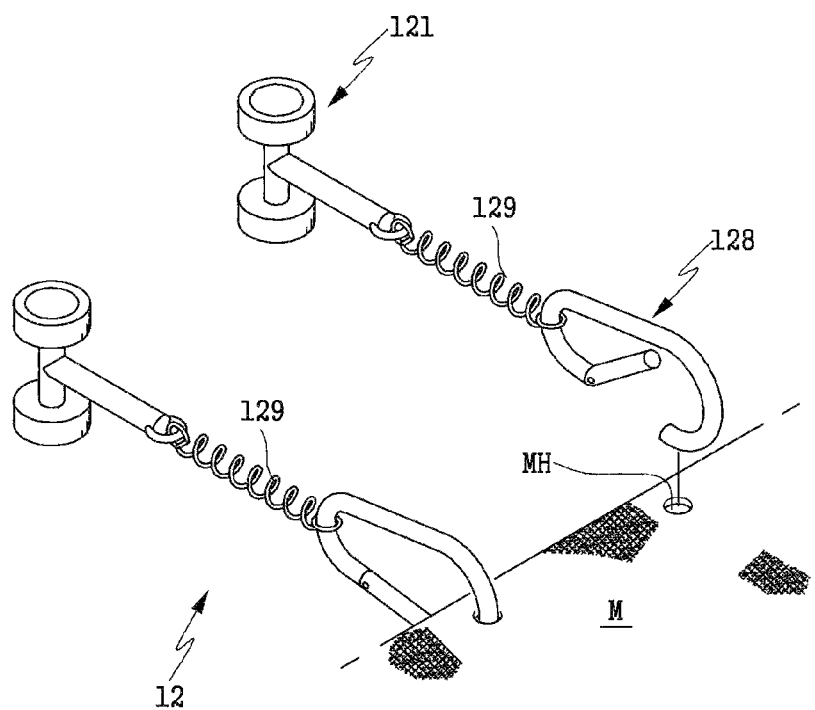

[Figure 9]
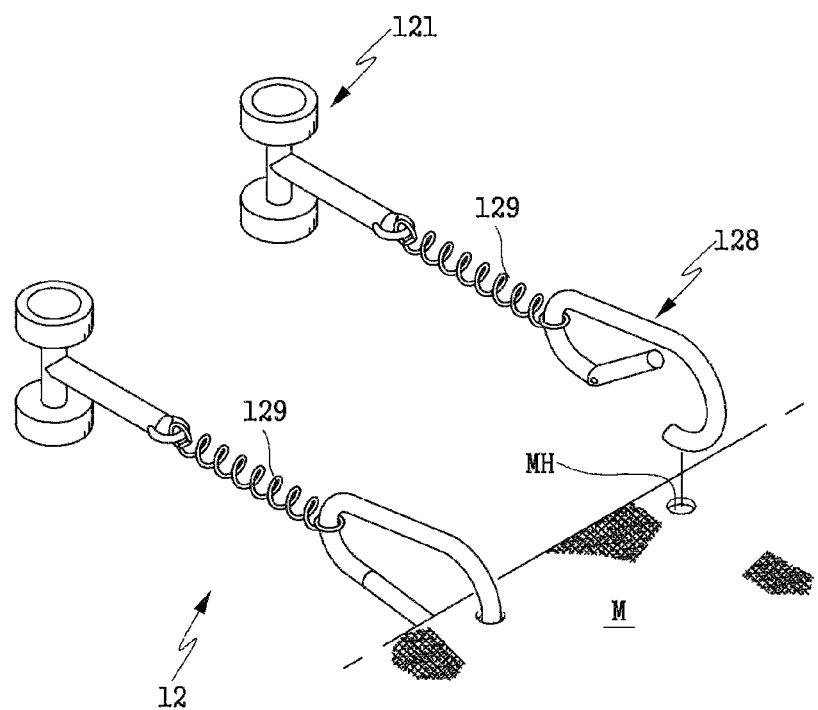

[Figure 10]
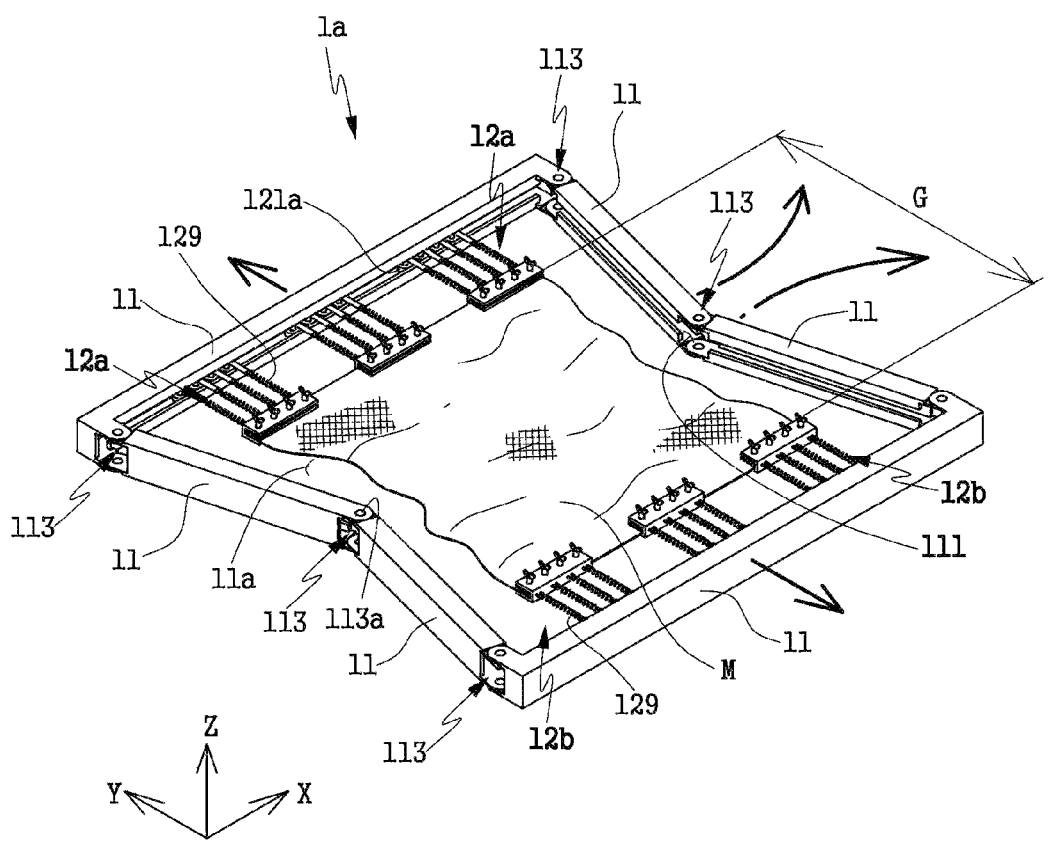

[Figure 11]
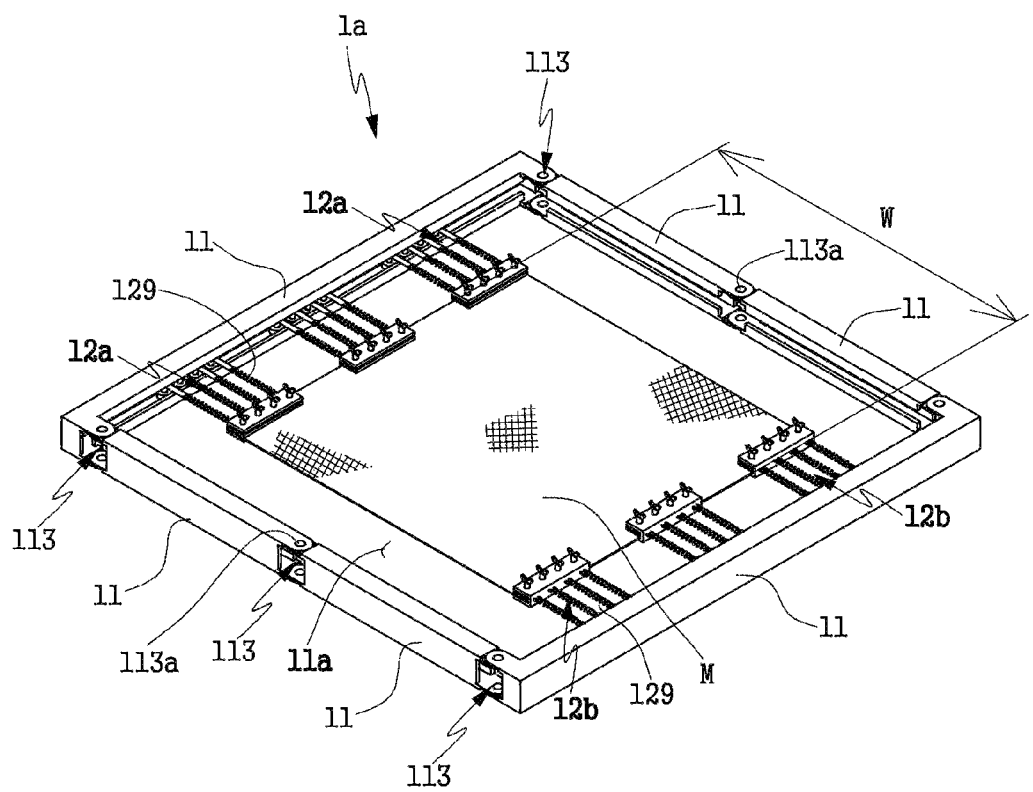

THERMOPLASTIC COMPOSITE GRIP FOR MANUFACTURING PROCESS

TECHNICAL FIELD

The present invention relates to an apparatus for fixing thermoplastic composite.

BACKGROUND ART

Generally, thermoplastic composites are made by impregnating resins to fabrics. According to arrangement of fabrics, their excellent mechanical properties can be used. For this reason, there have been high demands of lightweight in a field such as aircrafts, automobiles, and so forth.

In order to form articles employing these thermoplastic composites, cut-out thermoplastic composites with a predetermined standard are arranged in molds. Through the molds, the thermoplastic composites are heated and pressed to be formed in a certain shape.

During a molding process, thermoplastic composites are not stably fixed, so that they are damaged and the moldability of molded products is declined.

DISCLOSURE

Technical Problem

It is therefore an object of the present invention to provide an apparatus for fixing a thermoplastic composite capable of molding the thermoplastic composite in a fixed state.

Technical Solution

Embodiments of the present invention provide an apparatus for fixing a thermoplastic composite for fixing the thermoplastic composite and placing a transferring tray to be transferred to a forming mold, the apparatus comprises a frame unit having a location space where the thermoplastic composite is positioned and placed on the transferring tray and a plurality of connecting units for connecting the frame unit and the thermoplastic composite to pull the thermoplastic composite toward the frame unit.

Pursuant to embodiments of the present invention, the plurality of connecting units have variable length and move along the frame unit.

Pursuant to embodiments of the present invention, each of the plurality of connecting units comprises a moving unit movable along the frame unit and rotatable, a fixing unit combined with the thermoplastic composite, and an elastic member for connecting the fixing unit and the moving unit.

Pursuant to embodiments of the present invention, a rail is formed along a circumference of the location space.

Pursuant to embodiments of the present invention, the moving unit comprises a roller rolled along the rail, and a rod for connecting the roller and the elastic member.

Pursuant to embodiments of the present invention, the rod comprises a fixing rod connected to the roller and being opened inside, an operating rod exposed from inside to outside of the fixing rod and is axis rotatable, and a fixing ring formed in the operating rod and connected to the elastic member.

Pursuant to embodiments of the present invention, an inner flange is formed along an inner circumference of the fixing rod, and an outer flange is formed along an outer circumference of the operating rod, and the operating rod is not separated from the fixing rod while the inner flange is in contact with the outer flange.

Pursuant to embodiments of the present invention, a plurality of inner balls in contact with the outer circumference the operating rod to be rolled are arranged in the inner flange, and a plurality of outer balls in contact with the inner circumference the fixing rod to be rolled are arranged in the inner flange Pursuant to embodiments of the present invention, the rod comprises a fixing rod connected to the roller, an operating rod for connecting the fixing rod and the elastic member, and a joint for connecting the fixing rod and the operating rod.

Pursuant to embodiments of the present invention, the operating rod is rotated by the joint to bended.

Pursuant to embodiments of the present invention, the fixing unit includes at least one selected from the group consisting of a bolt, a pin, and karabiner, which penetrates the thermoplastic composite up and down.

Pursuant to embodiments of the present invention, the fixing unit includes a tongs or a clap, which presses and fixes a surface of the thermoplastic composite.

Pursuant to embodiments of the present invention, fixing unit comprises a fixing body including an inserting hole where an edge of the thermoplastic composite is inserted, a pressing bar arranged inside the fixing body to press the edge of the thermoplastic composite, and a controlling member arranged in the fixing body and pressurizing the pressing bar to press the thermoplastic composite.

Pursuant to embodiments of the present invention, a plurality of unevenness is formed at one side of the pressing bar faced at edges of the thermoplastic composite intervals and a bottom of the inserting hole.

Pursuant to embodiments of the present invention, the fixing unit is point or surface contact with the thermoplastic composite.

Pursuant to embodiments of the present invention, an articulating unit for partitioning the frame unit is further included.

Pursuant to embodiments of the present invention, the frame unit is bended by the articulating unit.

Pursuant to embodiments of the present invention, the distance of the connecting units faced at the thermoplastic composite intervals becomes narrowed.

The foregoing summary is illustrative only and is not intended to be in any way limiting. In addition to the illustrative aspects, embodiments, and features described above, further aspects, embodiments, and features will become apparent by reference to the drawings and the following detailed description.

Advantageous Effects

According to an embodiment of the present invention, a thermoplastic composite having various shapes that arranged in a location space can be fixed through a location movement and length change of a connecting unit and an axis rotation. As a result, the moldability a molding product using a thermoplastic composite becomes improved.

According to another embodiment of the present invention, a connecting unit is positioned depending on properties of a thermoplastic composite, during a molding process, the thermoplastic composite can be fixed optimizely.

DESCRIPTION OF DRAWINGS

FIG. 1 is a perspective view of an apparatus for fixing a thermoplastic composite according to an embodiment of the present invention;

FIG. 2 is a cross-sectional view taken along with lines II-II of FIG. 1;

FIG. 3 shows an expanded view of a connecting unit;

FIG. 4 is a cross-sectional view showing another embodiment of a rod of FIG. 3;

FIG. 5 shows an expanded view of A of FIG. 4;

FIG. 6 is a cross-sectional view showing another embodiment of the rod of FIG. 3;

FIG. 7 shows an expanded view of a fixing unit of FIG. 3;

FIG. 8 is a cross-sectional view showing another embodiment of the rod of FIG. 3;

FIG. 9 is a cross-sectional view showing another embodiment of the fixing unit of FIG. 3;

FIG. 10 is a perspective view of an apparatus for fixing a thermoplastic composite according to another embodiment of the present invention; and FIG. 11 is a perspective view showing that a frame unit bended by an articulating unit is spread.

MODE FOR INVENTION

Hereinafter, the present invention will be described in detail with reference to the drawings. In describing the present invention, detailed descriptions related to publicly known functions or configurations will be omitted in order not to obscure the gist of the present invention.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

The present invention may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Hereinafter, an apparatus for fixing a thermoplastic composite according to an embodiment of the present invention will be described referring to FIGS. 1 to 3.

FIG. 1 is a perspective view of an apparatus for fixing a thermoplastic composite according to an embodiment of the present invention. FIG. 2 is a cross-sectional view taken along with lines II-II of FIG. 1. FIG. 3 shows an expanded view of a connecting unit.

Referring to FIGS. 1 to 3, an apparatus for fixing a thermoplastic composite according to an embodiment of the present invention 1 comprises a frame unit 11 and a connecting unit 12. The apparatus for fixing a thermoplastic composite is capable of molding the thermoplastic composite in a fixed state. The thermoplastic composite is at least one selected from the group consisting of polyphenylene sulfide (PPS), polyetherketoneketone (PEKK), and polyetherketone (PEEK).

The frame unit 11 and the connecting unit 12 are made of materials enduring at a temperature ranging from 100° C. to 400° C.

The frame unit 11 is formed in a rectangular-shaped. The shape of the frame 11 is variously changeable. A location space 11a in which the thermoplastic composite can be placed is formed in the frame unit 11.

A rail 111 is formed in the frame unit 11. The rail 111 is opened along an inner circumference of the frame unit 11 where the location space 11a is formed to be formed in a hole-shaped. The rail 111 is connected to the location space 11a and in which a stopping part 112 is formed. The rail 111 may be formed on an upper surface of the frame unit 11. The shape and position of the rail 111 depends on a design of the apparatus for fixing the thermoplastic composite.

A plurality of the connecting units 12 are arranged in the location space 11a to be combined with the frame unit 11. The connecting unit 12 supports a thermoplastic composite M to be positioned in the location space 11a. The facing plurality of the connecting units 12 fixes the thermoplastic composite M by pulling it each other toward the frame unit 12. The plurality of the connecting units 12 12 include a fixing unit 128 and an elastic member 129. The number of the connecting units 12 depend on the area of the thermoplastic composite M.

A moving unit 121 includes a roller 121a and a rod 122a and is movable along the frame unit 11.

The roller 121a includes a shaft connecting a couple of wheels and another couple of wheels. The roller 121a is positioned on the rail 111 and is movable long the rail 111. The roller 121a is caught at the stopping part 112 in the rail 111 so that it does not leave the frame unit 11. In the meanwhile, an exist (not shown) for inserting and pulling out the roller 121a into/from the rail 111 is formed on a part of the inner circumference of the frame unit 11. The exist is formed by omitting the stopping part 112. By moving the roller 121a, the position of the connecting unit 12 can be freely controlled according to the shape of the thermoplastic composite M.

One end of the rod 122a is connected to the shaft of the roller 121a to be exposed on the location space 11a through an opening unit of the frame unit 11. As not shown in Figure, the rod 122a may be connected to the shaft to be axis-rotatable. The other end of the rod 122a is connected to the elastic member 129.

By moving the roller 121a, the connecting unit 12 can be freely movable and is capable of flexibly corresponding to the thermoplastic composite M.

Next, other embodiments of the rod will be described referring to FIG. 4.

Referring to FIG. 4, a rod 122b according to the embodiment of the present invention includes a fixing rod 123b, an operating rod 125b, and a fixing ring 125d.

The fixing rod 123b has a predetermined length of the operating rod 125b. One end of the fixing rod 123b is connected to a shaft of the roller 121a. The other end of the fixing rod 123b is projected from the rail 111 to the location space 111a. The inside of the fixing rod 123b is opened toward the other end thereof, and an inner flange 124a is formed on inner circumference thereof.

One end of the operating rod 125b is positioned inside the fixing rod 123b, and the other end thereof is exposed outside the fixing rod 123b. An outer flange 126a facing the inner flange 124a is formed on an outer circumference of the one end of the operating rod 125b. The operating rod 125b is capable of performing a linear motion in the fixing rod 123b and rotational motion on an axis. When the operating rod 125b performs a linear motion, the outer flange 126a is caught with the inner flange 124a so that the operating rod 125b does not leave the fixing rod 123b.

The fixing ring 125d is arranged at the other end of the operating rod 125b and connected to the elastic member 129. As not shown in Figure, the fixing ring 125d is connected to the operating rod 125b to be rotatable. Accordingly, the fixing ring 125d of the operating rod 125b is individually rotatable on an axis each other.

As shown in FIG. 5, an outer ball 126c is arranged on a circumference of the outer flange 126a facing the inner circumference of the fixing rod 123b. A plurality of inner balls 124b are arranged on a circumference of the inner flange 124a facing the outer circumference of the operating rod 125b. The outer ball 126c rolls along the circumference of the fixing rod 123b, and inner ball 124b rolls along outer circumference of the operating rod 125b. As a result, frictional force is degraded to promote an axis rotation of the operating rod 125b.

By the rotation and length control of the rod 122b, and moving the roller 121a, the connecting unit 12 can be freely movable in the frame unit 11, so that it is capable of flexibly corresponding to the thermoplastic composite M.

Next, another embodiments of the rod will be described referring to FIG. 6.

Referring to FIG. 6, a rod 122c according to the embodiment of the present invention includes a fixing rod 123c, an operating rod 125c, and a joint 127. The operating rod 125c is connected to the fixing ring 125e.

The fixing rod 123c and the operating rod 125c have a predetermined length and connected through the joint 127 each other.

One end of the fixing rod 123c is connected to the shaft of the roller 121a, and the other end thereof is exposed through the opening unit to be positioned on the location space 11a.

The joint 127 is arranged at the other end of the fixing rod 123c. The joint 127 is connected to a housing 127a in which an articulating groove 127b and the operating rod 125c, and includes an articulating ball 127c positioned at the articulating groove 127b. Thus, the operating rod 125c is freely movable up and down around the operating rod 123c. Through the free movement of the fixing rod 123c, the connecting unit 12 is capable of flexibly corresponding to the shape of the thermoplastic composite M.

Referring to FIG. 3 again, the elastic member 129 includes a coil spring, but is not limited to this. Through the elastic member 129, the moving unit 121 and the fixing unit 128 are connected. The elastic member 129 can be expanded according to the shape and location of the thermoplastic composite M. The spring constant may be different according to the shape and location of the thermoplastic composite M.

Referring to FIG. 7, the fixing unit 128 includes a fixing body 128a, a pressing bar 128c, and a controlling member 128d, and catches and fixes edges of the thermoplastic composite M.

The fixing body 128a has a predetermined length and one end thereof is connected to the elastic member 129. The elastic member 129 is arranged along a length direction of the fixing unit 128a. In this case, the moving unit 121 having the same number as the elastic member 129 is arranged.

An inserting hole 128b in which the edges of the thermoplastic composite M are inserted is formed in the fixing body 128a. The inserting hole 128b is formed along the length direction of the fixing unit 128b and opened in the other side. Accordingly, the thermoplastic composite M is inserted to the inserting hole 128b through the opened other side of the fixing body 128a.

The pressing bar 128c is positioned at the inserting hole 128b to be arranged along the length direction of the fixing unit 128a. The edges of the thermoplastic composite M are inserted between one sides of the pressing bar 128c and the inserting hole 128b to be in surface contact with one sides of the pressing bar 128c and the inserting hole 128b. The pressing bar 128c presses the thermoplastic composite M in order for the thermoplastic composite M not to be left from the inserting hole 128b.

In the meanwhile, a concavo-concave unit 128e is formed on a bottom side of the pressing unit 128c and one side of the inserting hole 128b in order to enlarge a contact area of the thermoplastic composite M. The concavo-concave unit 128e is formed along the length direction of the pressing bar 128c and the fixing unit 128a.

The controlling member 128d includes a bolt. The controlling member 128d is fastened with an upper side of the fixing unit 128a and an end portion thereof is connected to the pressing bar 128c. As the controlling member 128d is fastened with the fixing unit 128a, it presses the pressing bar 128c toward one side of the inserting hole 128b. The pressing bar 128c fixes the thermoplastic composite M by pressing it on one side. As a result, the edges of the thermoplastic composite M are fixed inside of the fixing body 128a. A plurality of the controlling member 128d are arranged toward the length direction of the fixing unit 128a at intervals.

The thermoplastic composite M is surface contact with fixing unit 128. Accordingly, even if the thermoplastic composite M is thermally transformed, it can be stably fixed in the fixing unit 128.

In the meanwhile, as shown in FIG. 8, the fixing unit 128 is connected to the elastic member 129 and may include a bolt for In this case, the fixing unit 128 is combined with the thermoplastic composite M being in point contact therewith.

In addition, the fixing unit 128, as shown in FIG. 9, is connected to the elastic member 129 and may include a karabiner that is caught the through hole MH of the thermoplastic composite M. Accordingly, the fixing unit 128 is combined with the thermoplastic composite M being in point contact therewith.

As not shown in Figure, the fixing unit 128 may include a pin for penetrating the through hole MH of the thermoplastic composite M. The fixing unit 128 may include a tongs or a clap, which presses and fixes a surface of the thermoplastic composite M.

However, the fixing unit 128 and the thermoplastic composite M are in point and surface contact at the same time, which can be changed according to materials or shapes of the thermoplastic composite M.

Therefore, a thermoplastic composite having various shapes that arranged in the location space 11a can be optimizely fixed through a location movement and length change of a connecting unit and an axis rotation during a molding process.

Next, an apparatus for fixing a thermoplastic composite in accordance with another embodiment of the present invention will be described referring to FIGS. 10 and 11.

FIG. 10 is a perspective view of an apparatus for fixing a thermoplastic composite according to another embodiment of the present invention. FIG. 11 is a perspective view showing that a frame unit bended by an articulating unit is spread.

Referring to FIGS. 10 and 11, an apparatus for fixing a thermoplastic composite according to an embodiment of the present invention 1a has most of elements of embodiments described referring to FIGS. 1 to 9. There is a difference in that the frame unit 11 of the present embodiment is divided by the articulating unit 113. The divided portions of the frame unit 11 is duplicated up and down. A hinge pin 113a penetrates the divided portions. The hinge pin 113a is combined with the frame unit 11 with not interfering with the roller 121a moving the rail 111.

Through this articulating unit 113, the frame unit 11 may be bended. FIG. 10 shows that the frame unit 11 is bended through the articulating unit 113 toward X-direction. According to the arrangement of the articulating unit 113, the frame unit 11 may be bended through the articulating unit 113 toward Z-direction. The bended direction of the frame unit 11 is not limited in this regard. As the frame unit 11 is bended, the gap G of the connecting units 12a and 12b faced at the thermoplastic composite M intervals becomes narrowed. In this case, the gap G of the faced connecting units 12a and 12b may be narrower than the width of when the thermoplastic composite M is completely spread. Accordingly, the faced connecting units 12a and 12b when the thermoplastic composite M is in a loose state can be easily combined with the thermoplastic composite M.

If the gap G of the faced connecting units 12a and 12b may be wider than the width of when the thermoplastic composite M, the connecting units 12a and 12b should be pulled toward the thermoplastic composite M. In this case, since the elastic member 129 should be increased, it is not easy for the faced connecting units 12a and 12b to be combined with the thermoplastic composite M. However, as the frame unit 11 is bended by the articulating unit 113 and the gap G of the faced connecting units 12a and 12b becomes narrow, the connecting units 12a and 12b can be combined with the thermoplastic composite M without increasing the elastic member 129. Accordingly, it is simple and convenient that the thermoplastic composite M is combined with the apparatus for fixing the thermoplastic composite 1a.

When the faced connecting units 12a and 12b that are combined with the thermoplastic composite M spread the bended frame unit 11, they pull are the thermoplastic composite M with being remote each other. As a result, the elastic member 129 becomes increased, and the thermoplastic composite M can be tightly maintained between the faced connecting units 12a and 12b.

In the meanwhile, as not shown in Figure, in order for the spread frame unit not to be bended by elastic force, a clamp or a ratchet gearing may be mounted in the divided portions of the frame unit 11.

A number of features described in the embodiments of FIGS. 1 to 9 are applicable to the present embodiment.

All such changes, modifications, variations and other uses and applications which do not depart from the spirit and scope of the invention are deemed to be covered by the invention which is limited only by the claims which follow.

The invention claimed is:

1. An apparatus for fixing a thermoplastic composite, the apparatus comprising:
a frame having a location space where the thermoplastic composite is positioned; and
a plurality of connectors for connecting the frame and the thermoplastic composite to pull the thermoplastic composite toward the frame,
wherein the plurality of connectors have variable length, each of the plurality of connectors has a first end connected to the frame and a second end connected to the thermoplastic composite, and the first end is movable along the frame,
wherein each of the plurality of connectors comprises:
a moving unit movable along the frame and rotatable;
a fixing unit combined with the thermoplastic composite; and
an elastic member for connecting the fixing unit and the moving unit
wherein a rail is formed along a circumference of the location space, and
wherein the moving unit comprises:
a roller rolled along the rail; and
a rod for connecting the roller and the elastic member.

2. The apparatus of claim 1, wherein the rod comprises:
a fixing rod connected to the roller and being opened inside;
an operating rod exposed from inside to outside of the fixing rod and is axis rotatable; and
a fixing ring formed in the operating rod and connected to the elastic member,
wherein an inner flange is formed along an inner circumference of the fixing rod, and an outer flange is formed along an outer circumference of the operating rod, and
wherein the operating rod is not separated from the fixing rod while the inner flange is in contact with the outer flange.

3. The apparatus of claim 2, wherein a plurality of inner balls in contact with the outer circumference the operating rod to be rolled are arranged in the inner flange, and a plurality of outer balls in contact with the inner circumference the fixing rod to be rolled are arranged in the inner flange.

4. The apparatus of claim 1, wherein the rod comprises:
a fixing rod connected to the roller;
an operating rod for connecting the fixing rod and the elastic member; and
a joint for connecting the fixing rod and the operating rod,
wherein the operating rod is rotated by the joint to bended.

5. The apparatus of claim 1, wherein the fixing unit includes at least one selected from the group consisting of a bolt, a pin, and karabiner, which penetrates the thermoplastic composite up and down.

6. The apparatus of claim 1, wherein the fixing unit includes a tongs or a clamp, which presses and fixes a surface of the thermoplastic composite.

7. The apparatus of claim 1, wherein the fixing unit comprises:
a fixing body including an inserting hole where an edge of the thermoplastic composite is inserted;
a pressing bar arranged inside the fixing body to press the edge of the thermoplastic composite; and
a controlling member arranged in the fixing body and pressurizing the pressing bar to press the thermoplastic composite.

8. The apparatus of claim 7, wherein a plurality of unevenness is formed at one side of the pressing bar faced at edges of the thermoplastic composite intervals and a bottom of the inserting hole.

9. The apparatus of claim 1, wherein the fixing unit is point or surface contact with the thermoplastic composite.

10. The apparatus of claim 1, further comprising an articulating unit for partitioning the frame, wherein the frame is bended by the articulating unit, and the distance of the connectors faced at the thermoplastic composite intervals becomes narrowed.

* * * * *